United States Patent [19]
Kaufman

[11] Patent Number: 5,199,323
[45] Date of Patent: Apr. 6, 1993

[54] APPARATUS FOR CONNECTING A MEMBER TO A SHAFT AT ANY ANGULAR POSITION

[75] Inventor: Leslie C. Kaufman, Edina, Minn.

[73] Assignee: Honeywell Inc., Minneapolis, Minn.

[21] Appl. No.: 342,491

[22] Filed: Apr. 24, 1989

[51] Int. Cl.$^5$ .............................................. G05G 1/00
[52] U.S. Cl. .......................................... 74/559; 74/523;
403/383; 403/256; 267/273
[58] Field of Search .............. 74/522, 523, 559, 551.1,
74/525, 537.3; 403/290, 383, 256; 267/154, 273,
277; 248/230, 231.6

[56] References Cited

U.S. PATENT DOCUMENTS

| 820,292 | 5/1906 | Dunbar | 403/4 |
|---|---|---|---|
| 1,306,119 | 6/1919 | Pharo | 74/559 |
| 1,328,688 | 1/1920 | Pond | 403/344 |
| 1,619,810 | 3/1927 | Cautley | 74/559 |
| 1,637,520 | 8/1927 | Dodge | 74/559 |
| 1,644,261 | 10/1927 | Marles | 74/559 |
| 2,108,331 | 2/1938 | Graves | 403/383 |
| 2,270,895 | 1/1942 | Rabe | 287/52.02 |
| 2,376,714 | 3/1945 | Mussen | 403/359 |
| 2,484,551 | 10/1949 | Brouse | 74/522 |
| 2,600,101 | 6/1952 | Faulhaber | 155/5.24 |
| 2,951,548 | 8/1960 | Crockett et al. | 267/273 |
| 3,814,528 | 6/1974 | Duer | 403/256 |
| 4,728,218 | 3/1988 | Durham | 74/594 |
| 4,777,841 | 10/1988 | Kitchen | 74/559 |

FOREIGN PATENT DOCUMENTS

| 0145444 | 6/1985 | European Pat. Off. | 74/551.1 |
|---|---|---|---|
| 1571841 | 7/1980 | United Kingdom | 74/551.3 |

Primary Examiner—Richard E. Chilcot, Jr.
Assistant Examiner—Winnie Yip
Attorney, Agent, or Firm—Edward Schwarz

[57] ABSTRACT

Apparatus for fixing a member at any angular position to the non-circular cross section of a shaft has an insert formed of a relatively soft material and a clamping element fixed to the member. The insert has a central bore whose cross section matches the shaft section cross section, a circular periphery, and a slot between the periphery and the central bore. The clamping element is formed of relatively hard, rigid material, and has a bore in surrounding relation to the periphery of the insert and conforming to it so as to permit rotation of the member with respect to the insert while the clamping element bore is undistorted. There is at least one tooth on the periphery of the clamping element bore projecting radially inward toward the insert. Preferably the periphery of the clamping element bore is completely knurled instead of having a single tooth. The clamping element includes means to be operated with the insert on the shaft cross section which distorts the clamping element adjacent its bore to force the tooth into the insert's periphery and compress the insert to fix the member and the insert to the shaft. The angular position of the member is set as desired before the clamping element is distorted.

20 Claims, 1 Drawing Sheet

APPARATUS FOR CONNECTING A MEMBER TO A SHAFT AT ANY ANGULAR POSITION

BACKGROUND OF THE INVENTION

Certain mechanisms employ actuator arms or other mechanical members which are mounted for rotation on a shaft. It is frequently required that the member have a precise angular position with respect to the shaft. For example, in mechanisms which are used to open and close damper vanes within an air duct, the actuator arm must have a precise and maintainable angular position on the shaft so as to assure that the damper can reach its extreme open and closed positions.

Heretofore there have been a number of different mechanical connections employed between a shaft and its member, but in general, these provide incremental rather than continuous angular positions of the member with respect to the shaft. For example, the shaft may be splined with the member's bore splined to match. However, it can be easily seen that even a relatively large number of splines will still result in relatively large angles between sequential positions. Twenty splines on a shaft provide 18° steps in angular position. The same situation results with a shaft having a regular polygonal cross section and a member having a conforming bore. Note that even an octagonal shaft cross section results in 45° angles between adjacent member angular positions.

In the case of an arm member, it is also possible to provide an incrementally adjustable articulation for the arm, but this involves additional manufacturing costs. The use of set screws, pinch fittings, or other clamping mechanisms to attach the member to the shaft is usually not suitable if more than a nominal amount of torque is to be transferred.

Accordingly, there is a requirement for apparatus allowing an arm or other member to be securely fixed for rotation to a shaft at any one of an infinite number of angular positions.

SUMMARY OF THE INVENTION

Apparatus which strongly fixes a member to the non-circular cross section of a shaft at any desired angular position includes an insert element formed of a relatively soft material and a clamping element fixed to the member. The insert has a central bore whose cross section matches or conforms to the shaft section cross section, a circular periphery, and a slot extending radially between the periphery and the central bore. The clamping element is formed of material which is hard and rigid compared to the material of the insert. The clamping element has a circular bore in surrounding relation to the periphery of the insert and conforming to it so as to permit rotation of the member with respect to the insert while the clamping element bore is undistorted. There is at least one tooth on the periphery of the clamping element bore projecting radially inward toward the insert. Preferably the periphery of the clamping element bore is completely knurled with a plurality of teeth. The clamping element includes means to be operated with the insert on the shaft cross section which distorts the clamping element adjacent its bore to force the tooth into the insert's periphery and compress the insert to fix the member and the insert to the shaft. The angular position of the member is set as desired before the clamping element is distorted.

I prefer that the clamping element be made from steel and the insert of aluminum.

To accomplish the required distortion of the clamping element, it is convenient to provide a slot extending from the bore in the clamping element to an outer edge of it. A bolt can then pass across this slot and through coaxial holes adjacent the outer end of the slot. The threads on the end of the bolt fit into a nut, for example, so that tightening the nut on the bolt draws the walls of the slot toward each other and clamps the insert within the clamping element bore.

It is also convenient to provide a retaining means which allows for axially retaining the insert within the clamping element's bore.

In a preferred embodiment, the apparatus is formed from a plate which is bent to axially align two holes which cooperatively form the clamping element bore. A slot is formed in the plate between the two holes. The insert may be positioned so that the step of bending the plate axially retains the insert within the slot formed by the bending step, or the insert may be inserted in the bore after the bending step.

Accordingly, one purpose of this invention is to provide mounting apparatus which allows an arm or other member to be mounted on a non-circular shaft with an infinite number of angular positions relative to the shaft possible for the member.

Another purpose is to allow the mounting apparatus to be easily slipped on the shaft.

Yet another purpose is to allow the member to be easily and securely fixed to the shaft.

Yet another purpose is to allow the angular position of the member to be easily changed from one to another desired angular position and then refixed to the shaft.

Other purposes of this invention will be apparent from the following description.

DESCRIPTION OF THE PREFERRED EMBODIMENT

Figure 1:
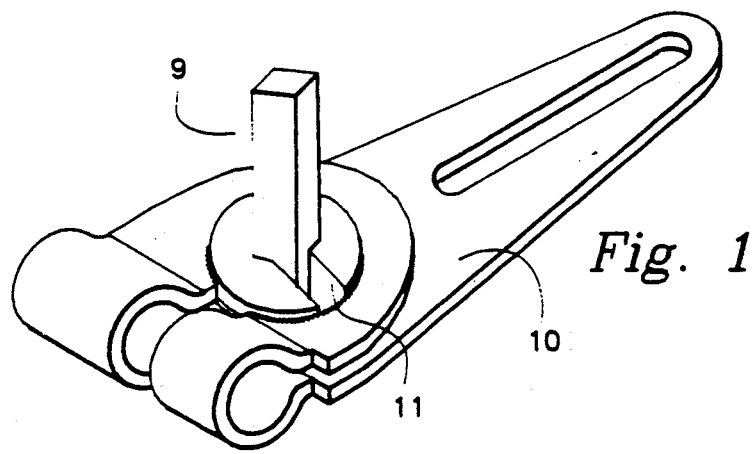
FIG. 1 is a perspective view of the attachment apparatus.
Figure 2:
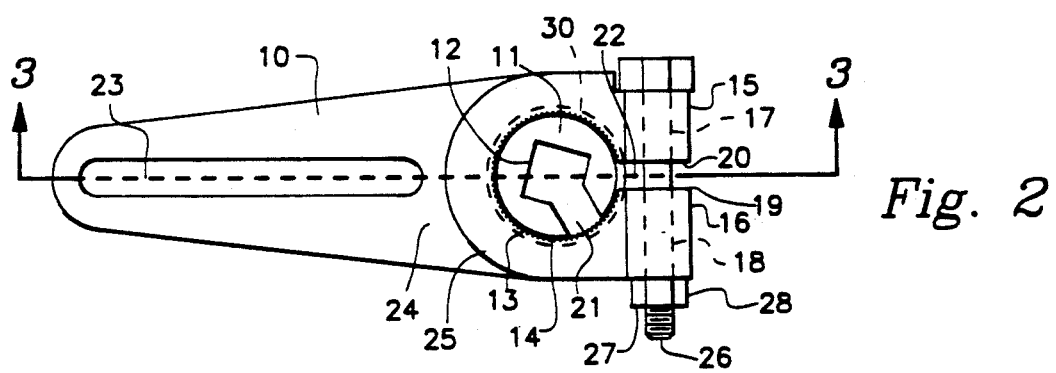
FIG. 2 is a side projective view of the attachment apparatus.
Figure 3:
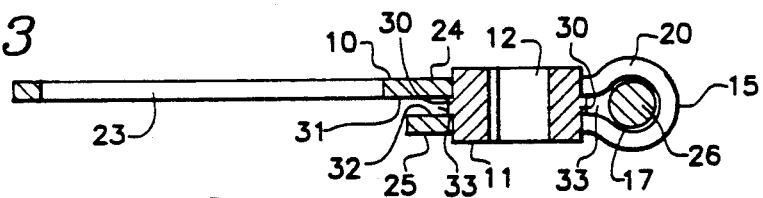
FIG. 3 is a section view through the apparatus of FIG. 2.

Considering first FIGS. 1-3 together, a member 10 is mounted for rotation on shaft 9 by the attachment apparatus which is the subject of this invention. The attachment apparatus itself comprises a clamping element formed of flat plate segments 24 and 25, cylindrical projections 15 and 16, and bolt 26 and nut 28. The clamping apparatus is shown as integral with arm 10, although this is not necessary.

The clamping element comprises a relatively hard material such as mild steel. The clamping element includes a bore 14 with a circular periphery on which is located at least one hard, rigid tooth projecting radially inward, although my preference is for knurling 13 extending as shown around the entire periphery of bore 14. A relatively hard material is selected for the clamping element as the most convenient way to provide for the teeth comprising knurling 13 to be relatively hard and rigid.

The clamping element further comprises a pair of projections 15 and 16 having walls respectively 20 and 19 which define between them a slot 22 which extends from the bore 14 to the edge of the clamping element adjacent the outer surfaces of projections 15 and 16. Projections 15 and 16 have coaxial holes 17 and 18 respectively passing through themselves and the walls 20 and 19. A bolt may be inserted in the holes 17 and 18, extending across slot 22 and engaging the threads of a nut 28. The purpose of this structure is to permit rotation of bolt 26 relative to nut 28 to distort the clamping element to reduce the diameter of bore 14 by drawing the walls 20 and 19 of slot 22 toward each other.

There is an insert 11 which fits within bore 14 and transmits torque between the clamping element and shaft 9. Insert 11 has a central bore 12, and is formed of a relatively soft and rigid material with respect to knurling 13. The cross section of bore 12 is shaped to conform to some non-circular shaft cross section, a square cross section being shown. There is a slot 21 extending generally radially between the central bore 12 and the periphery of insert 11. Insert 11 has a circular periphery, to which bore 14 is shaped to conform, and which closely encircles the periphery to insert 11. It is important when bolt 26 is loosened, that insert 11 be able to rotate freely with respect to the clamping element. Insert 11 must be made from a relatively soft yet rigid material such as aluminum, and aluminum of the hardness T6063 is a material known to function satisfactorily. Other aluminum alloys, brass, copper, zinc, and alloys of these metals will also function properly. It is also possible that certain of the relatively hard plastics or softer plastics with fiberglass reinforcing will also function satisfactorily as a material from which insert 11 may be made and will be particularly useful if member 10 must be electrically insulated from shaft 9.

The preferred clamping element includes segments 24 and 25 having walls 31 and 32 which face each other and define between them a slot 33 which extends to in essence define an annular groove around the entire periphery of bore 14. Insert 11 includes an annular shoulder 30 which projects into slot 33 to thereby form an interference fit between segments 24 and 25 and be axially retained thereby in the position shown in FIGS. 2 and 3. The shoulder 30 and slot 33 need not extend completely around their respective peripheries so long as insert 11 is properly retained and there is sufficient rotation permitted between insert 11 and the clamping element.

The attachment apparatus of FIGS. 1-3 is mounted on the shaft 9 shown by slipping the conforming cross section of the central bore 12 of insert 11 on the corresponding shaft cross section. Arm member 10 is rotated to the desired position, and for example, the device which arm member 10 is to actuate may be connected to slot 23. Then bolt 26 is tightened onto nut 28, distorting the clamping element adjacent bore 14 to reduce the diameter of bore 14 and forcing the teeth of the knurling 13 into the periphery of insert 11. At the same time, insert 11 is distorted by the clamping force generated by bolt 26 to slightly close slot 21, with the result that insert 11 clamps tightly onto shaft 9. With the clamping element thus tightly clamped to insert 11, and the insert tightly clamped to shaft 9, arm member 10 may thus be strongly fixed in any of an infinite number of angular positions. The knurling 13 should have teeth of sufficient height and sharpness so as to cause actual cold flow of the peripheral surface of insert 11, thus assuring that no slippage will occur between the clamping element and insert 11. Because the knurling forms its connection at a relatively large radius, shear forces between the clamping element and the insert 11 are relatively small, and are distributed over the circumferential area of the large diameter cylindrical periphery of insert 11. This allows substantial torque to be transmitted. Further, the axial lengths of the bore 14 and insert 11 and the thicknesses of segments 24 and 25, can be increased as desired to provide the required level of torque to be transmitted.

Figure 4:
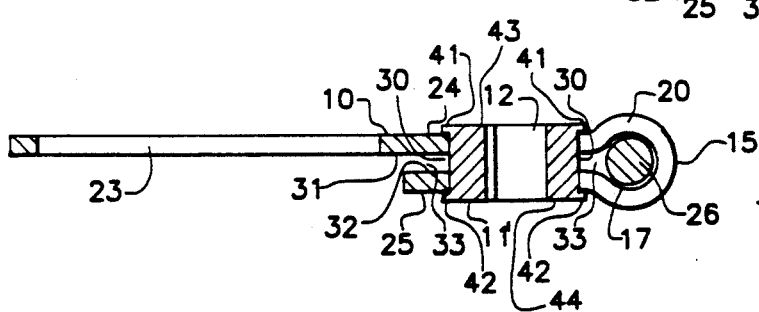
FIG. 4 is a section view through the apparatus of FIG. 2 but showing a slightly different insert.

FIG. 4 is very similar to the section view shown for FIG. 3, the difference lying in the small radially projecting flanges or shoulders 41 and 42 adjacent the flat surfaces of insert 11'. These flanges 41 and 42 form an interference fit with bore 14 and serve to retain insert 11' within the bore 14 in the clamping element. These projections are very small, extending radially perhaps a few hundredths of an inch. They can be conveniently formed by the process known as "staking" where ring-like dies whose inner diameters are slightly smaller than the outer diameter of insert 11', are pressed against the two flat faces 43 and 44 of insert 11' after insert 11' has been positioned within bore 14. Great pressure causes the material of insert 11' to cold flow radially a small amount to form flanges 41 and 42 and thereby cause insert 11' to be retained within bore 14.

Figure 5:
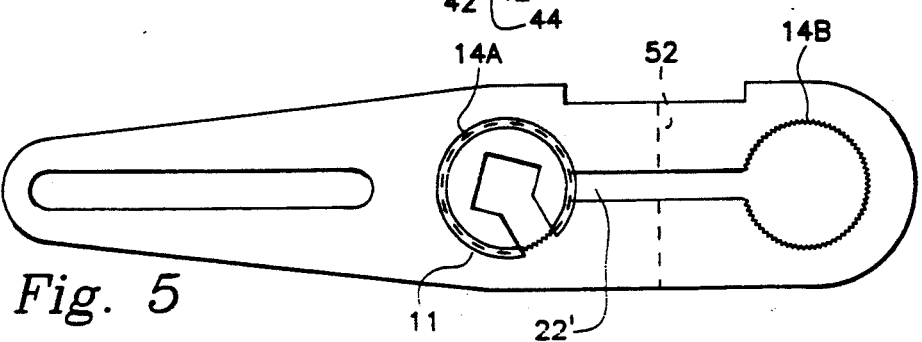
FIG. 5 is a projective view of the plate from which the attachment apparatus is formed.

The preferred article from which a unitary arm member 10 and clamping element is formed comprises the flat plate shown in FIG. 5. A method for forming the clamping element from a plate having the outline shown first includes forming the circular holes 14A and 14B adjacent each other with the knurling as shown. The diameters of these holes, measured at the tips of individual knurls, should equal the diameters of the insert 11 adjacent shoulder 30. Then a slot 22' is cut which connects these holes 14A and 14B. An insert such as insert 11 is formed as shown with bore 12 and slot 21. Insert 11 is positioned in axial alignment with one of the circular holes 14A or 14B and then the plate is bent between the holes 14A and 14B and along the bend line 52 so that section 25 is bent around to the position shown in FIG. 3 to axially align the centers of holes 14A and 14B, simultaneously forming slot 33 and retaining insert 11 permanently within bore 14. The bend line 52 perpendicularly intersects a line connecting the centers of the two holes 14A and 14B. It is preferred that a cylindrical die (not shown) placed tangent to bend line 52 be used during the bending operation to define holes 17 and 18 in projections 15 and 16. Of course, the machining operation forming the knurling 13 can be performed at any time prior to the bending step. Preferably, holes 14A and 14B can be formed by punching with a punch shaped to automatically form the knurling desired.

It can be seen that there are a number of variations which can be applied to this design and which still fall within the broad scope of it. For example, in FIG. 3, the slot 33 present between sections 24 and 25 need not extend completely around the periphery of bore 14. Similarly, ridge or shoulder 30 need not extend annularly around the entire periphery of insert 11, but instead could comprise simply a projection such as a pin driven into a hole in insert 11. The pin then would project into the slot 3 of the clamping element. In this case then the slot need not annularly extend around the entire periphery of bore 14 but instead may subtend an angle sufficient only for the adjustment in angular position required for the particular application involved.

It has been considered whether the insert 11 can carry the knurling and be made from the relatively hard and rigid material, and the clamping element be made of the relatively soft material. In theory this embodiment of the invention is possible, but the strength of the clamping element is reduced if made from the softer material such as aluminum. It is, of course, possible to have a soft lining surrounding the periphery of bore 14 into which the hard teeth of the hypotheorized insert 11 may sink, but this results in entirely unnecessary cost and inconvenience.

It is important to note that the angular position of the insert's slot 21 at the time the clamping element is distorted is not critical in the least. It has been my experience that, as long as slot 21 is provided, the element 11 will distort sufficiently under the force of the reduction in diameter of bore 14 to firmly grip shaft 9 and strongly oppose any accidental removal from the shaft due to vibration or stress.

It is possible also to devise other clamping element designs which allow bore 14 to be distorted and angularly fit insert 11. For example, there may be provided movable jaws or wedges which clamp onto insert 11 immobilizing it both with respect to shaft 9 and member 10.

The embodiments of the invention in which an exclusive property or right is claimed are defined as follows:

1. Apparatus for fixing a member at any position within a predetermined angular range to a non-circular cross section of a shaft, comprising
   a) an insert formed of a relatively soft, rigid material and having a central bore whose cross section conforms to the shaft cross section, a circular periphery, and a slot extending radially between the periphery and the central bore; and
   b) a clamping element fixed to the member and formed of relatively hard, rigid material, and having a bore whose periphery conforms to the periphery of the insert and has at least one tooth thereon projecting radially inward from the clamping element bore's periphery, said clamping element bore adapted to receive the insert in surrounding relation to the clamping element bore's periphery thereof and permitting relative angular rotation of the clamping element with respect thereto, said clamping element further including clamping means to be operated with the insert positioned on the shaft cross section for distorting the clamping element adjacent its bore to reduce its bore diameter, for forcing the tooth into the insert's periphery, and for clamping the clamping element to the insert and the insert to the shaft.

2. The apparatus of claim 1, wherein the clamping element includes a portion containing the bore and having a slot defined by walls extending from the clamping element bore to an outer edge of the clamping element, and wherein the clamping means includes a bolt mounted for rotation adjacent to the outer edge of the clamping element and extending across the slot and engaging threads in a portion of the clamping element adjacent the clamping element's slot, with rotation of the bolt within and relative to the threads drawing the walls defining the clamping element's slot toward each other.

3. The apparatus of claim 2, wherein the walls defining the slot further define an outer end thereof spaced from the bore, and wherein the clamping element adjacent the outer end of the clamping element slot includes a pair of coaxial bores intersecting the walls of the slot and in which the blot is journaled.

4. The apparatus of claim 2, wherein the slot pierces the adjacent portion of the clamping element.

5. A method for forming the clamping element of claim 2, including the steps of:
   a) forming a pair of circular holes adjacent each other in a plate formed of the relatively hard and rigid material, the diameter of said holes substantially equaling diameters of the insert, at least one of said holes having the tooth formed on its periphery;
   b) forming a slot connecting the pair of holes; and
   c) bending the plate between the holes and along a bend line to axially align the centers of the holes, to finally position the sides of the plate adjacent the holes substantially parallel to and spaced apart from each other to thereby form the clamping element from the plate with the pair of circular holes in combination defining the clamping element bore.

6. The method of claim 5, wherein the plate bending step comprises bending the plate around a cylindrical die to thereby form coaxial holes intersecting the walls of the clamping element's slot.

7. The method of claim 5, wherein the step of forming the circular holes further comprises the step of machining a pattern of knurling around the periphery of at least one of the circular holes in the plate to provide the tooth.

8. The apparatus of claim 1, wherein a knurled portion of the clamping elements bore comprises the tooth.

9. The apparatus of claim 8 wherein the knurled portion of the bore comprises substantially all of the periphery of the clamping elements bore.

10. The apparatus of claim 9, wherein the insert comprises aluminum and the clamping element comprises steel.

11. The apparatus of claim 1 wherein the insert comprises aluminum.

12. The apparatus of claim 1 wherein the clamping element comprises steel.

13. The apparatus of claim 12, wherein the insert comprises aluminum.

14. The apparatus of claim 1, wherein the outer periphery of the insert is relatively smooth prior to operating the clamping means.

15. The apparatus of claim 1, wherein the insert includes retaining means comprising a radial projection in interference with the periphery of the clamping element's bore for axially retaining the insert within the clamping element's bore.

16. The apparatus of claim 15, wherein the clamping element bore's inner periphery includes an area in which is disposed an annular groove extending into and around at least a portion of the bore's inner periphery and into which extends the radial projection of the insert.

17. The apparatus of claim 16, wherein the radial projection of the insert comprises an annular ridge extending around at least a portion of the insert's periphery.

18. The apparatus of claim 15, wherein the clamping element includes an area in which is disposed an annular slot piercing and extending around at least a portion of the bore's inner periphery and into which extends the radial projection of the insert.

19. The apparatus of claim 18, wherein the clamping element's annular slot has walls substantially perpendicular to the axis of the bore and which totally intersect the bore, said clamping element including a transverse slot extending from the bore to the edge of the clamping element and further including a hole extending from first to second edges of the clamping element and through the transverse slot and in which a bolt for drawing the walls of the transverse slot toward each other may be placed.

20. The apparatus of claim 15, wherein the insert projects past the sides of the clamping element, and further includes a radially projecting annular flange adjacent each edge of the circular periphery and forming an interference fit with the clamping element's bore.

* * * * *